Patented Apr. 23, 1940

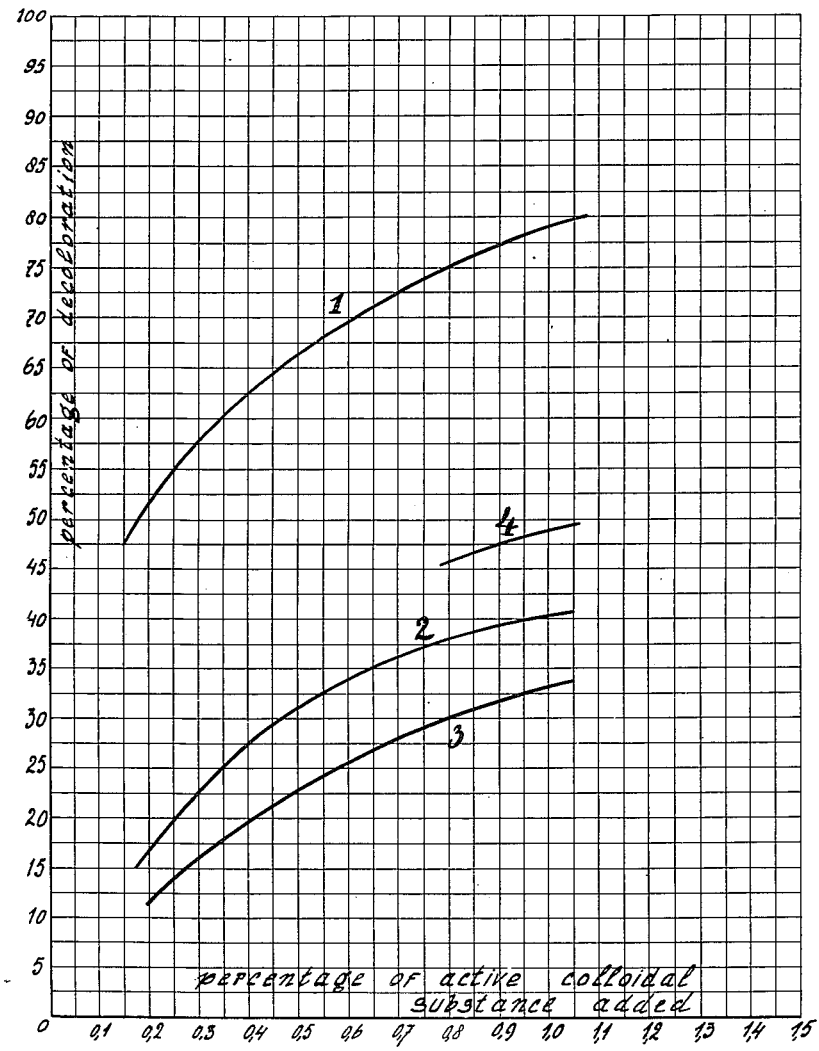

2,198,393

UNITED STATES PATENT OFFICE 2,198,393

PURIFICATION OF LIQUID MATTER

Pieter Smit, Amsterdam, Netherlands, assignor to N. V. Octrooien-Maatschappij "Activit", Amsterdam, Netherlands Application May 22, 1935, Serial No. 22,684 In the Netherlands May 29, 1934

4 Claims. (Cl. 210—23)

My invention relates to the purification of liquids and other liquid matter and more especially to the decoloring and to the improving of odor and taste as well as to the removing of colloidal matter from liquids. It is an object of this invention to provide means for effecting such purification in a simpler and more efficient manner than was hitherto possible.

It is well known to those skilled in the art that purification of liquids is effected as a rule with the aid of the active substances and quite especially active carbon, and that one has always striven to impart to such active substances a chemically inert character in order that the purification of the liquids takes place principally by physical action, the chemical properties of these substances being as a rule regarded as of little importance.

In order to render active carbon and the like chemically inert, one has prepared the carbon at a high temperature, which necessitated the use of costly apparatus and a great deal of attendance. For the same reason the manufacture of active carbon is carried out in factories specially built for that purpose. The raw materials used in this manufacture are of a most varied character, almost all carbonaceous materials available in nature being useful for this purpose, including wood, anthracite, brown coal, peat, flour, etc., but also artificially prepared material such as sugar, molasses, rags, etc. These raw materials are charred either by heating or by treating them at a high temperature (red heat or above) with suitable gases or by impregnating them with suitable chemicals working a decomposition of their molecules and by finally heating them to a red heat or to a still higher temperature. The chemicals used in such treatment have always been removed again from the material under treatment, for instance by washing, before applying the material to the purification or other improvement of liquids.

According to my invention the organic starting materials which were hitherto used in the preparation of active carbon and the like, instead of being charred at high temperatures and thereafter washed out to altogether remove the treating agents, are acted upon at a moderate temperature, for instance at boiling temperature, with a highly concentrated chemical, for instance sulfuric acid or some other chemical hitherto used in the preparation of active carbon, which is capable of splitting off from the organic starting compound the H and O contained therein in the proportion in which these elements occur in $H_2O$. In contrast to the practice universally followed in the preparation of active carbon I further omit the step, universally adopted in this preparation, of completely washing out the decomposing chemical, and deliberately leave this chemical, for instance the sulfuric acid, in the decomposition product either altogether or for the greater part. The $H_2O$ formed in the decomposition may remain in the molecule by way of hydratation and it may further be accompanied by other changes in the molecule, such as sulfonation, where sulfuric acid was used, in which case the decomposition treatment may even lead to an increase in weight of the decomposed product.

This product has been found to possess altogether new and very valuable properties.

The product of the decomposition of an organic compound containing H and O in the molecule, for instance a carbohydrate, by treatment of the compound at a moderate temperature, for instance boiling temperature, with a chemical of the kind afore-mentioned, for instance highly concentrated sulfuric or phosphoric acid or chloride of zinc or the like, has been found to possess colloidal character and valuable ion exchanging properties. I have hitherto not succeeded in ascertaining the constitution of the these products, but I have found that the circumstance that they are prepared at a moderate, not a high temperature, such as red heat, and that they still contain material quantities of the acids or other chemicals used for decomposing the starting material and for rearranging the O and H forming part of its molecule, renders them more efficient for purification and decoloration purposes than the so-called active carbon or other substances hitherto used for this purpose.

As a rule it is not necessary that the active colloidal matter according to my invention still contain the whole of the decomposing chemicals when brought in contact with the liquid to be purified. As a rule the quantity of such chemicals necessary for producing a highly active colloidal substance will be greater than the quantity required for purification or for obtaining certain chemical inversions and it may be economical, in such cases, to wash out and eventually recuperate a certain part of these chemicals.

I have found it particularly advantageous to employ substances according to this invention in a purification process, where a chemical of the kind used in the decomposition of the organic starting materials, from which these substances are produced, such as for instance sulfuric acid, is present as a means of purification or as participating in certain chemical reactions.

It is for instance customary to purify oils, fats, paraffin, lubricating oil and the like by treating them with sulfuric acid. Such acid is also used for the decomposition of carbohydrates such as for instance starch, flour and cellulose. Similarly sulfuric acid is present when converting flour into glucose, when producing fermentable sugars from wood meal or other cellulosic material; acid is also added during the inversion of saccharose. The addition of acid and other water-attracting chemicals has, however, often the effect that undesirable by-products are produced; thus for instance, if producing glucose, coloring matter or other substances will be formed which impart to the product a disagreeable smell or taste.

Although such treatment with acids or water-attracting chemicals may act towards improving the color, it is as a rule necessary to subject the liquid to be purified to a further treatment with absorbing agents (active carbon or bleaching earth). The process according to the present invention which includes the addition of water-attracting chemicals to carbonaceous material, offers quite a number of advantages.

In the first place the active colloidal product obtained need not be wholly freed from these chemicals by washing, which is a very expensive and time-consuming procedure. Furthermore the use of an active substance produced in this manner, if combined with an acid treatment of the raw material or a treatment with other chemicals, offers the advantage that impurities, coloring matter, etc., which may be formed, are removed immediately after they are formed. It is a well known fact that the presence of impurities favors the development of further impurities by auto-catalytic action. Therefore the manner in which the material is purified during its production, is of particular importance.

Further by suitably choosing the proportions in which the carbonaceous material is mixed with water-attracting chemicals, and the conditions under which they are made to act upon each other, renders it possible to obtain the most favorable results. As carbonaceous material, with which water-attracting chemicals shall be mixed, there may very often be used part of the raw material itself. It is also possible to use such active colloidal substances, which have already been utilized once or several times for purification. In such case the substances may be said to be regenerated.

Obviously cases may occur, where it is impossible to add the active colloidal substance, which contains the water attracting chemicals, to the liquid, since by so doing undesirable chemical reactions might be induced or the liquid might be soiled.

According to the present invention the absorptive properties of such active substances can be preserved and even greatly improved, if the soluble constituents of this substance are bound. In order to attain this end, it is not altogether necessary that all constituents be bound, for it is also possible to obtain good results with a partial binding. It may for instance be necessary that the liquids to be purified have a predetermined pH which must be taken into account, when adding the active substance. It is of course possible to partially free the mixture of carbonaceous material from the water-attracting chemicals by washing. The washed-out chemicals may be reused either by carrying out the washing process in a systematic manner or by recovering them by evaporation. The activity is greatly increased if the binding is effected in such manner that a precipitate is formed. I have found that the binding of the soluble constituents need not under all circumstances be effected within the liquid to be treated, but may also take place outside of the liquid. Such preliminary binding may even be recommendable in certain cases, although it is as a rule desirable that it take place in the liquid itself. This is the case for instance when decoloring and purifying sugar liquors, taking regard to a possible inversion. In such case the active colloidal substance is neutralised separately from the liquid to be decolored for instance with caustic soda, whereby no precipitate is formed, while, for instance if barium chloride is added, a precipitate is formed. In such case it is of course unnecessary to add another precipitant. Furthermore the liquid itself may already have an alkaline reaction, so that it is not necessary to add such alkali.

As shown in the diagram annexed to this specification, this mode of proceeding gives very favorable results, even in the case where the ordinary kind of active carbon does not give any or only very little results. In the diagram the abscissa shows the percentage of substance added, the ordinate the percentage of decoloration. The active colloidal substance may be brought in contact with the liquid to be treated during about 15 minutes at a temperature of 60° C. Curve 1 represents the treatment of carbonaceous material with sulfuric acid and some phosphoric acid, which is neutralised with barium carbonate. Curve 2 shows the treatment with decoloring carbon ("Carboraffin"), curve 3 the decoloration with active carbon sold under the trade name "Activit C," curve 4 represents carbonaceous material which has been freed from sulfuric acid by washing. The kinds of carbon here indicated are ordinary products of commerce having an inert character.

Decoloration is obtained as shown by the following examples:

(a) Decoloring of raw sugar from Roosendaal. The sugar was dissolved up to 60° Brix in ordinary water and treated with:

(Calculated for dry substance)

| | Percent |
|---|---|
| 0.2% Activit C_____decoloration__ | 11.5 |
| 0.6% Activit C_____do____ | 25.5 |
| 1% Activit C_____do____ | 33 |
| 0.2% of the above mixture_____do____ | 52 |
| 0.5% of the above mixture_____do____ | 67 |
| 0.2% Carboraffin_____do____ | 17 |
| 0.6% Carboraffin_____do____ | 33 |
| 1% Carboraffin_____do____ | 40 |

(b) Refined beet-sugar was dissolved in ordinary water to 60° Brix. The time of contact was 15 minutes, the temperature 60° C.

| | Percent |
|---|---|
| 0.1% (of the sugar) Activit C__decoloration__ | 40 |
| 0.1% of the above mixture with acid, neutralised at 70° C. with BaCO₃_____ decoloration__ | 85 |
| 0.1% of the above mixture, after previous washing with the exception of the exchangeable ions_____ | 55 |

Refined Cuba-sugar dissolved to 50° Brix,
0.1% of the above mixture with acid neutralised at 70° C. with BaCO₃_____
_____ decoloration__ 80
0.1% of the above mixture, previously washed out with the exception of the exchangeable ions_____decoloration__ 75

The purification of liquids according to this invention will proceed in a particularly satisfactory manner, if acids and more especially concentrated sulfuric acid and/or phosphoric acid are used as water-attracting chemicals.

In practising my invention I may for instance proceed as follows:

EXAMPLE 1.—*Purification of glucose in solution during its production*

40 kgs. chemically pure sulfuric acid of 66° Bé. are mixed with 24 kgs. wood meal and the product thus formed is finely ground. It is now placed in a well-leaded or a copper kettle, which has previously been filled with 300 litres water. The mixture is now heated to boiling by means of steam, whereupon flour paste is added without the boiling of the liquid being stopped.

This flour paste is obtained by mixing 2000 kgs. pure corn meal with water to form a liquid of 20° Bé. which is introduced into the kettle during about 30 minutes. The contents of the kettle are then kept boiling during about 5 hours whereupon chalk is added to bind the free acid which is still present therein. The liquid may now be filtered. The filtrate is far better in color and taste than that which is obtained by the usual treatment, in which the acid is not mixed with carbonaceous material. The filtrate obtained in this process showed a color of 14, according to the potassium platinum scale, as against a color of 115 shown by the filtrate of the ordinary process.

A still better result is obtained if boiling is continued until all so-called dextrines (the intermediate products between flour and glucose) have disappeared. The inversion to glucose may also take place under pressure, for instance under a pressure of 2 atmospheres. In that case the percentage of acid in the mixture must be very much decreased in order that the inversion does not proceed too quickly. A diminution of the acid to 50% is sufficient in this case.

Instead of directly entering into the leaded kettle the absorbing agent obtained by acting with sulfuric acid on carbonaceous material, one may first wash out part or all of the sulfuric acid from the absorbing agent and utilize this washed out sulfuric acid in the conversion of the flour and add the product during or after the end of the reaction.

When starting from very pure starting material, it is not necessary that the entire quantity of sulfuric acid be mixed with the wood meal; only part of it may be mixed therewith. The product thus produced may be added before or after adding the balance of the acid.

EXAMPLE 2.—*Purification of paraffin*

1000 kgs. of paraffin are molten in a mixing vat and a mixture of 50 kgs. concentrated sulfuric acid of 66° Bé. and 30 kgs. wood meal are added after having been finely ground. The temperature is raised to 110-120° C. After 20 minutes the liquid is filtered. The filtrate is treated during 15 minutes at 120° C. with 20 kgs. fuller's earth. Hereupon the product is filtered and the final product obtained.

This final product is as valuable as that which is obtained by first treating the same raw material with 50 kgs. concentrated sulfuric acid and thereafter with 50 kgs. fuller's earth.

Instead of admixing with carbonaceous material all of the acid required for the purification, one may also admix only part of it. When refining oil, it is for instance possible to first allow the free acid to act on the oil, and only thereafter the mixture, or vice versa.

EXAMPLE 3

To a mixture, prepared by mixing 50 kgs. dry wood meal with 60 kgs. concentrated sulfuric acid of 66° Bé. and 10 kgs. phosphoric acid, are added, directly after the addition of the acid, 150 kgs. dried and thereafter finely ground sea clay, so that neutralization takes place at a higher temperature.

By adding 50 milligrams of this mixture to a litre of underground water having a color, according to the potassium platinum scale, of 110, this color is reduced to 15.

Various changes may be made in the details disclosed in the foregoing specification without departing from the invention or sacrificing the advantages thereof.

In the claims affixed to this specification no selection of any particular modification of the invention is intended to the exclusion of other modifications thereof.

I claim:

1. In the treatment of impure liquids, the process which comprises the step of contacting a liquid to be purified with the solid reaction products resulting from the destructive dehydration of a finely divided, solid, carbonaceous material by means of a strongly dehydrating mineral acid selected from a group consisting of sulfuric and phosphoric acids, under conditions forming solid reaction products containing therein at least a substantial proportion of free mineral acid used in the destructive dehydration and having colloidal ion-exchanging properties, the step of separating said solid reaction products from the so-purified liquid and the step of treating said free mineral acid contained in said solid reaction products with a reactive substance capable of forming an insoluble precipitate therewith; the said precipitating step being conducted at least prior to the said separating step.

2. The process of claim 1 wherein said free mineral acid contained in said reaction products is precipitated during the time of contact of said liquid to be purified with said solid reaction products.

3. In the process of treating impure liquids wherein a liquid to be purified is contacted with the solid reaction products resulting from the destructive dehydration of a finely-divided, solid, carbonaceous material by means of a strongly dehydrating mineral acid selected from a group consisting of sulfuric acid and phosphoric acids, under conditions forming solid reaction products having colloidal ion-exchanging properties, the steps which comprise leaving in said solid reaction products at least a substantial proportion of free mineral acid used in said destructive dehydration, and precipitating said mineral acid in situ by adding a reactive substance capable of forming an insoluble precipitate with said mineral acid prior to contacting said reaction products with said liquid to be purified.

4. In the treatment of impure liquids containing impurities reactive with sulfuric acid, the process of treating such a liquor with the solid reaction products resulting from the destructive dehydration of a finely-divided, solid, carbonaceous material by means of strong sulfuric acid, under conditions forming reaction products containing therein at least a substantial proportion of free sulfuric acid used in said destructive dehydration and having colloidal ion-exchanging properties, and precipitating said free sulfuric acid in situ by the addition of a reactive substance capable of forming an insoluble precipitate with said acid at least prior to the separation of said reaction products from the resulting purified liquid.

PIETER SMIT.